UNITED STATES PATENT OFFICE.

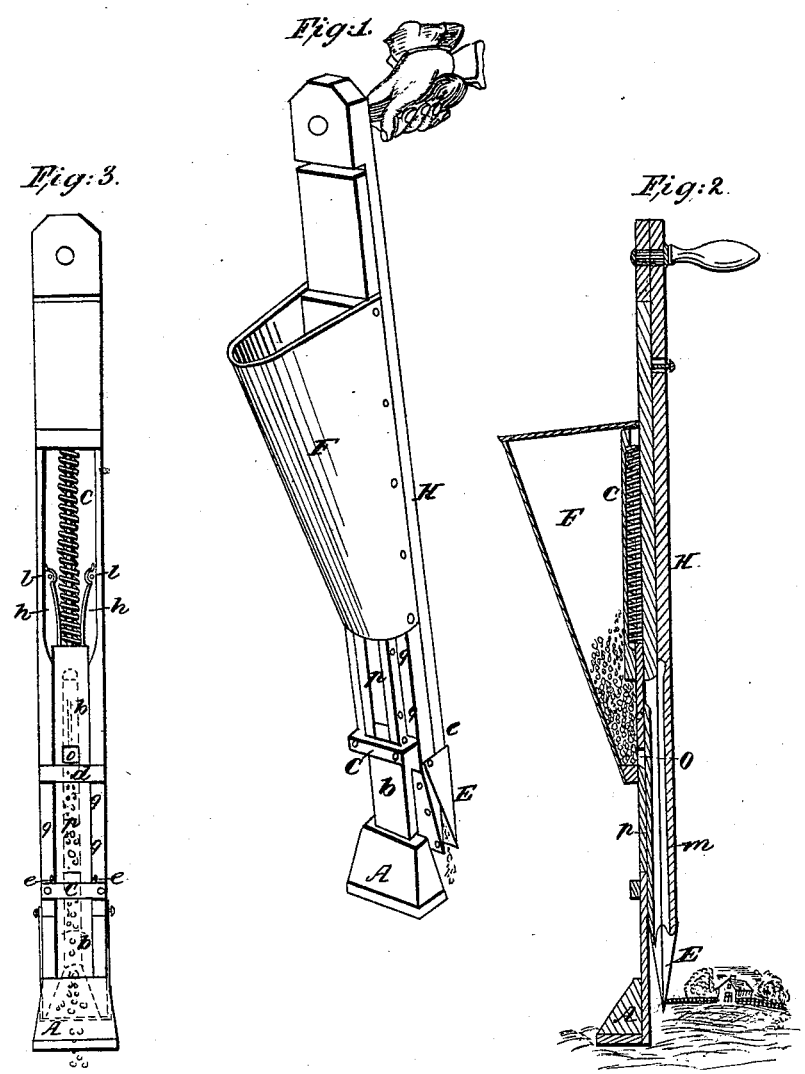

P. B. GREEN, OF CHICAGO, AND E. A. KENNEDY, OF NEWARK, ILLINOIS.

IMPROVEMENT IN SEED-PLANTERS.

Specification forming part of Letters Patent No. 15,101, dated June 10, 1856.

*To all whom it may concern:*

Be it known that we, PLYMON B. GREEN, of the city of Chicago, in the county of Cook, in the State of Illinois, (late of the town of Waukegan, in the county of Lake, in the State of Illinois,) and EDWARD A. KENNEDY, of the town of Newark, in the county of Kendall, in the State of Illinois, have invented a new, useful, and Improved Corn-Planter for Planting Corn and other Coarse Grain; and we do hereby declare that the following is a full, clear, and exact description of the construction and operation of the same, reference being had to the annexed drawings, making a part of this specification, in which said specification—

Figure 1 is a perspective view; Fig. 2, a sectional side view, representing the planter with the foot A resting upon the ground and the mouth E closed. In this position the planter is represented as being forced down into the ground with the orifice $o$ in seed-slide $b$, which receives the corn at the bottom of corn-box F, and retains it until the machine slides down on seed-slide $b$, when orifice $n$, at the top of groove $m$, comes in connection with orifice $o$ in seed-slide $b$. The corn passes down to mouth E. On raising the planter from the ground the mouth E is thrown open by raising the movable back H, depositing the corn in the ground. At the same time the spiral spring C forces the seed-slide $b$ down, when the planter assumes the position as represented in Fig. 1. Fig. 3 is a sectional front view, representing side springs, $h\ h$, and catches $l\ l$, which prevent the machine from sliding down on the seed-slide $b$ until the mouth is closed. The gage $p$ is held in its place by screws $q\ q\ q$, which can be moved up or down, so as to diminish or increase the orifice $o$ in such a manner as to effect the delivery of the proper number of kernels for each hill of corn. $e\ e$, stop-screws in slide; $c$, stop-cleat; $a$, bottom of corn-box.

What we claim as our invention, and desire to secure by Letters Patent, is—

The seed-slide $b$, in combination with the foot A, side springs, $h$, and catches $l$, arranged and operating in the manner and for the purpose set forth.

PLYMON B. GREEN.
EDWARD A. KENNEDY.

In presence of—
WILLIAM C. GREEN,
CHARLES F. KENNEDY.